US00RE34230E

United States Patent [19]

Tucker et al.

[11] E Patent Number: Re. 34,230

[45] Reissued Date of Patent: Apr. 27, 1993

[54] UNIFIED CASEMENT OPERATOR

[75] Inventors: Daniel G. Tucker, Elysian; Gregory J. Vetter, Owatonna, both of Minn.

[73] Assignee: Truth Division of SPX Corporation, Owatonna, Minn.

[21] Appl. No.: 790,768

[22] Filed: Nov. 12, 1991

Related U.S. Patent Documents

Reissue of:

[64] Patent No.: 5,054,239
Issued: Oct. 8, 1991
Appl. No.: 504,349
Filed: Apr. 4, 1990

[51] Int. Cl.[5] ..... E05F 11/02

[52] U.S. Cl. ..... 49/279; 49/345; 49/346; 49/394; 49/342

[58] Field of Search ..... 49/279, 280, 339, 341, 49/342, 345, 346, 394; 292/336

[56] References Cited

U.S. PATENT DOCUMENTS

| | | |
|---|---|---|
| 27,119 | 2/1860 | Fay et al. . |
| 1,471,736 | 10/1923 | Johnson . |
| 1,640,459 | 8/1927 | Lee . |
| 1,724,011 | 8/1929 | Flagg . |
| 1,748,662 | 2/1930 | Stewart . |
| 2,022,020 | 11/1935 | Westrope . |
| 2,036,151 | 3/1936 | Lang . |
| 2,114,645 | 4/1938 | Van Benschoten . |
| 2,136,812 | 11/1938 | Carnahan . |
| 2,157,016 | 5/1939 | Reynaud . |
| 2,256,613 | 9/1941 | Forman et al. . |
| 2,366,613 | 1/1945 | Hagstrom . |
| 2,449,761 | 9/1948 | Bemis . |
| 2,538,980 | 1/1951 | Payne, Jr. . |
| 2,784,459 | 3/1957 | Anderberg et al. . |
| 2,905,464 | 9/1959 | Shaw, Sr. . |
| 3,081,078 | 3/1963 | Lohr . |
| 3,145,988 | 8/1964 | Colautti et al. . |
| 3,154,302 | 10/1964 | Maruyama . |
| 3,202,414 | 8/1965 | Simmons et al. . |
| 3,257,755 | 6/1966 | Lewis . |
| 3,274,732 | 9/1966 | Murakami . |
| 3,541,874 | 11/1970 | Du Rocher . |
| 3,653,154 | 4/1972 | Hayday . |

(List continued on next page.)

FOREIGN PATENT DOCUMENTS

| | | |
|---|---|---|
| 0323241 | 5/1989 | European Pat. Off. . |
| 653755 | 12/1937 | Fed. Rep. of Germany . |
| 1176021 | 8/1964 | Fed. Rep. of Germany . |
| 2601342 | 1/1977 | Fed. Rep. of Germany . |
| 43872 | 12/1960 | Poland . |

*Primary Examiner*—Renee S. Luebke
*Assistant Examiner*—Michael J. Milano
*Attorney, Agent, or Firm*—Wood, Phillips, VanSanten, Hoffman & Ertel

[57] ABSTRACT

A casement operator for a window has a deployment linkage connectable between the window frame and the base and operable to cause movement of the window sash. A gear drive drives the deployment linkage, which coacts with a sash lock and a lock linkage having a window-actuated trigger. A plurality of rigid links are in pivotal engagement with the deployment linkage and in driving engagement with the gear drive, and a tie rod is disposed intermediate the rigid links and the sash lock. A trip lever with a trigger extending beyond the window frame is pivotally secured to the base and engageable with the lock linkage for restricting the movement of said lock linkage during a non-locking mode of operation of the operator. The deployment linkage includes a first element pivotally supporting one end of the window sash, a slider track along the window frame, a support link fixedly pivoted to the window sash on one end and to a second element on the other end, and a drive linkage having one end engaging the window sash and the other end drivably connected to the gear drive. The deployment linkage has the first element slidable in the slider track, the second element fixed relative to the window frame, and one end of the drive linkage fixed to the window sash and including a pivot intermediate its ends.

20 Claims, 3 Drawing Sheets

U.S. PATENT DOCUMENTS 4,064,651 12/1977 Homs .
4,241,541 12/1980 Van Klompenburg et al. .
4,253,276 3/1981 Peterson et al. .
4,266,371 5/1981 Erdman et al. .
4,305,228 12/1981 Nelson .
4,333,269 6/1982 Bascou .
4,392,330 7/1983 Buhr .
4,497,135 2/1985 Vetter .
4,571,776 2/1986 Taylor .
4,617,758 10/1986 Vetter .
4,679,352 7/1987 Bates .
4,726,092 2/1988 Tacheny et al. .
4,823,508 4/1989 Allen .
4,840,075 6/1989 Tucker .
4,845,830 7/1989 Nolte et al. .
4,860,493 8/1989 Lense .
4,937,976 7/1990 Tucker et al. .

UNIFIED CASEMENT OPERATOR

Matter enclosed in heavy brackets [ ] appears in the original patent but forms no part of this reissue specification; matter printed in italics indicates the additions made by reissue.

BACKGROUND OF THE INVENTION

This invention pertains to an improved mechanical operator for a casement or awning window.

There are, of course, any number of different types of window (and other closure) operators which are well known in the art. Examples of such operators are shown, for example, in Vetter Patent No. 4,497,135, Payne Patent No. 2,538,980, Flagg U.S. Pat. No. 1,724,011, and Fay et al. Patent No. 27,119.

Ideally, a window operator would be simple to use, not only opening and closing the window, but also reliably ensuring that the window locks and unlocks as it is opened and closed. Further, such operators should, ideally, be readily usable in any number of different configurations to provide whatever type of window operation is desirable.

The present invention is directed toward providing such ideal operating characteristics.

SUMMARY OF THE INVENTION

In one form of the present invention, a casement operator for a closure is provided wherein the operator has a handle for either closing the window sash or differentially activating a sash lock. The mode of operation of the handle is automatically determined by the engagement of a sash-sensing trigger with the closing sash.

In one aspect of this invention, a casement operator for a window is provided having a deployment linkage connectable between the window frame and said base and operable to cause movement of the window sash. A gear drive is operable by a handle to drive the deployment linkage. A lock linkage coacts with the deployment linkage and sash lock and includes a window-actuated trigger for activating the lock linkage.

In another aspect of this invention a plurality of rigid links are provided in pivotal engagement with the deployment linkage and in driving engagement with said rotatable handle, and a motion-transmitting tie rod is disposed intermediate the rigid links and the sash lock. Further, a trip lever with a trigger extending beyond the window frame is pivotally secured to the base and engageable with the lock linkage for restricting the movement of said lock linkage during a non-locking mode of operation of said operator.

In the illustrated embodiment of this invention, the operator is provided with a first element pivotally supporting one end of the window sash, a slider track along the window frame, a support link fixedly pivoted to the window sash on one end and to a second element on the other end, and a drive linkage having one end engaging the window sash and the other end drivably connected to a gear drive. The first element is slidable in the slider track, the second element is fixed relative to the window frame, and the drive linkage has one end pivotally fixed to the window sash and includes a pivot intermediate its ends.

It is an object of the present invention to provide an operator which can be inexpensively manufactured and installed.

It is another object of the present invention to provide an operator which can be easily operated and at the same time provide reliable and foolproof locking.

DESCRIPTION OF THE PREFERRED EMBODIMENT

Figure 1:
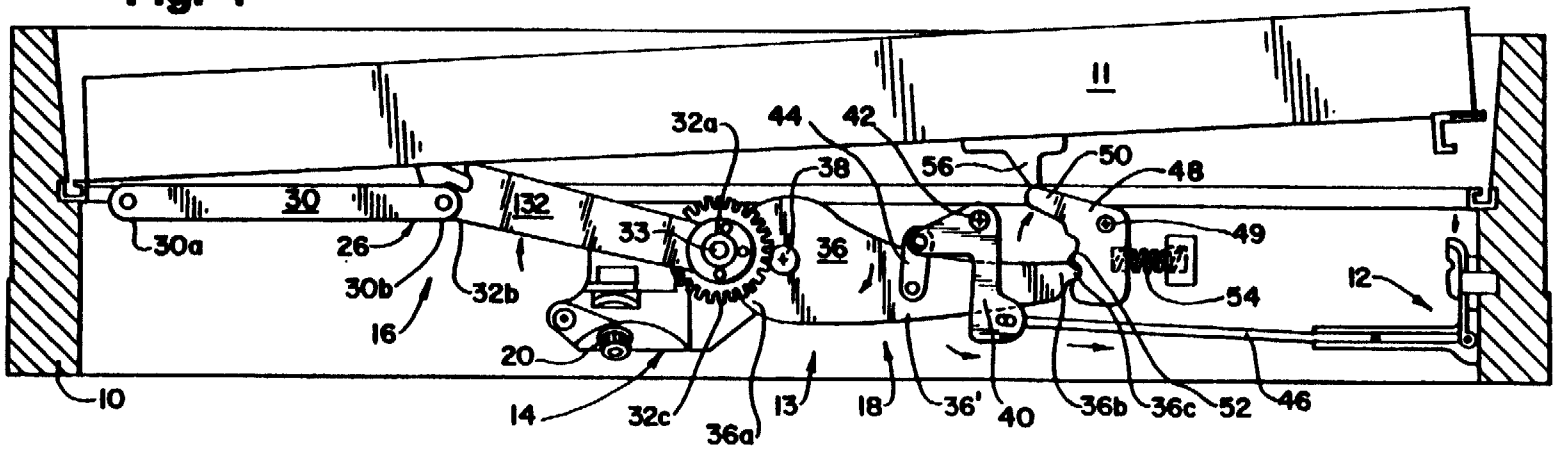
FIG. 1 is a plan view of the operating components of one embodiment of the present invention.

One embodiment of the present invention is shown generally in FIG. 1 in association with a casement window which is movable between a closed position and an open position. It will be apparent to a skilled artisan with an understanding of the present invention, however, that this invention can be used with many other types of windows (including, for example, awning windows) as well as other closures.

The casement window as shown in FIG. 1 has a window frame 10, a window sash 11, and a sash lock 12. A casement window operator 13 is provided having a base 14 which is mounted to the window frame. The operator 13 includes a mechanical deployment linkage 16 extending between the window frame 10 and the base 14, and a lock linkage 18 engaged with the deployment linkage 16 and coacting with the sash lock 12. A worm gear 20 drivingly connects a rotatable handle 22 with the deployment linkage 16 (see FIG. 6).

Figure 6:
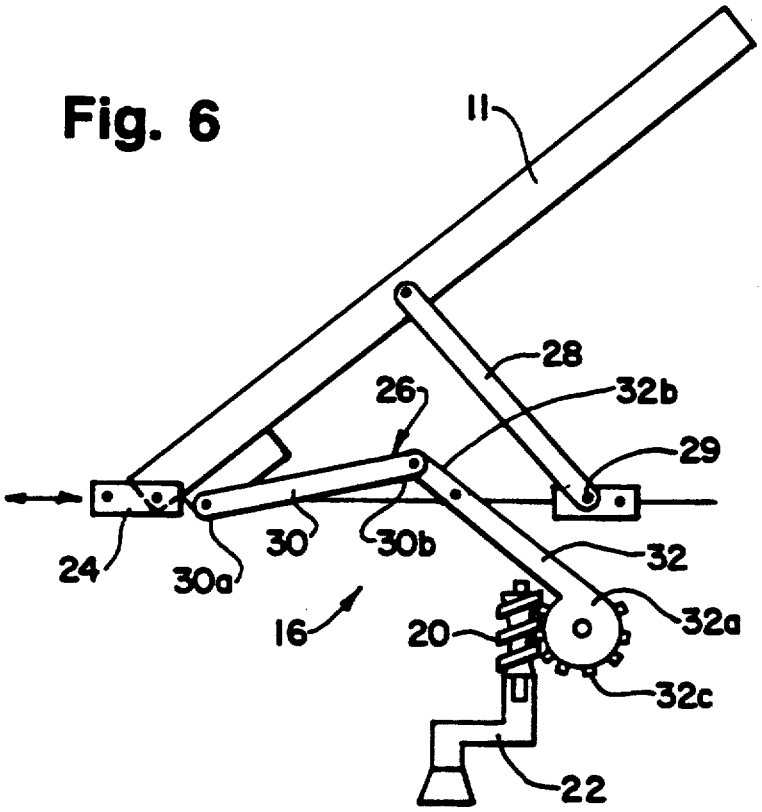
FIG. 6 is a partial plan view illustrating the present invention installed in an open configuration.

The deployment linkage 16 comprises a slider 24, a drive linkage 26, and a support link 28 (see especially FIG. 6). The drive linkage 26 includes a drag link 30 having oppositely spaced ends 30a, 30b and a gear arm 32 having one end 32b pivotally connected to one drag link end 30b. The other gear arm end 32a includes gear teeth 32c which engage the worm drive 20.

The slider 24 is disposed intermediate the window sash 11 and the window frame 10. The support link 28 is pivotally connected between the window sash and a pivot 29 fixed with respect to the window frame.

It will, of course, be understood that the form of the deployment linkage and arrangement of the drive links and pivotal connections can be modified to accommodate other kinematic relationships within the scope of the invention.

The lock linkage 18 includes a plurality of rigid links which are pivotally engaged with the deployment linkage 16 and thereby in driving engagement with the rotatable handle 22. Specifically, a lock linkage gear lever 36 has an end portion 36a which is pivotally connected to the toothed end 32a of the gear arm 32 at a free pivot 33 and pivotally connected relative to the base, 14 at a fixed pivot 38. An oppositely spaced end 36b of the gear lever 36 has a projecting portion or tab 36c. A lock linkage transmission link 40 is pivotally connected to a fixed pivot 42 and is further connected to the gear lever 36 by a lock linkage intermediate link 44.

A linear motion-transmitting tie bar or rod 46 is pivotally connected to the transmission link 40 and coacts with the sash lock 12. Specifically, motion of the tie rod 46 to the left in FIG. 1 will engage (lock) the sash lock 12, and motion of the tie rod 46 to the right in FIG. 1 will disengage (open) the sash lock 12.

The sash lock 12 illustrates merely one exemplary lock which could be used with the present invention. Any sash lock which can be opened and closed in response to such linear motion of the tie rod 46 would be suitable. For example, a bolt lock having bolts which project into (and retract from) openings in the window sash to lock (and release) the window would also be suitable where an appropriate linkage between the bolts and tie rod is provided. Of course, still other suitable sash locks would be recognized by any person of average skill in the art as being appropriate for use with the present invention.

The operator 13 includes a trip lever 48 pivotally connected to a pivot 49 on the base 14. The trip lever 48 includes a trigger 50 and a recess 52 for receiving the gear lever projecting tab 36c.

A compression spring 54 having one end fixed to the base 14 biases the trip lever 48 toward the gear lever projecting tab 36c. The trip lever 48 is configured so that the trigger 50 extends beyond the window frame 10 when the projecting tab 36c is in the trip lever recess 52.

A suitable stop (such as the stop 56 shown) may be provided on the window sash 11 so as to facilitate engagement with the trigger 50 when the window sash 11 is closed as described below.

Operation of the above described invention is thus as follows.

The basic operation of opening and closing the window is accomplished by the operator turning the handle 22.

When opening the window, the handle 22 and its connected worm gear 22 are turned to produce a clockwise rotation of the gear arm 32. The forced rotation of the gear arm 32 induces tension force in of the drag link 30. In order to kinematically accommodate this force, the slider 24 is urged along the frame 10 toward the fixed pivot 29 (to the right in FIG. 6). This motion also induces forced clockwise rotation of the support link 28 and results in the window sash 11 being outwardly rotated and the window thus being opened.

To close the window, the handle 22 is rotated in an opposite direction whereby the drive linkage 26 is oppositely actuated and forces the slider 24 away from the fixed pivot 29 to inwardly rotate the window sash 11.

When moving the window between the open and closed positions as described above, the sash lock is automatically opened and closed as appropriate as described below.

Specifically, when the window is open, the compression spring 54 biases trip lever 48 to the position shown in FIG. 1, with the trigger 50 extending beyond the window frame. When the window sash 11 approaches its fully closed position, the stop 56 engages the trigger 50 and rotates the trip lever 48 counterclockwise about the pivot 49 to free the gear lever tab 36c from the trip lever recess 52.

Then, when the window reaches its fully closed position (with the slider 24 at its travel limit as defined by the lengths of the drag link 30 and gear arm 32), continued rotation of the handle 22 and worm gear 20 will no longer pivot the gear arm 32. Thus, continued rotation of the handle 22 results in-the-slight downward displacement of the free pivot 33 (since the gear lever 36 is no longer restrained by the trip lever 48, such motion of the free pivot 33 causes a slight counterclockwise pivoting of the gear lever 36 about its fixed pivot 38). Pivoting of the gear lever 36 in turn causes vertical displacement of the intermediate link 44 and counterclockwise pivoting of the transmission link 40. Counterclockwise pivoting of the transmission link 40 forces the tie rod 46 toward the left to activate the sash lock.

When it is desired to open the locked window, turning the handle 22 in the opposite direction will automatically unlock the sash lock. That is, since the window is locked shut by the sash lock, the initial turning of the handle 22 will cause the free pivot 33 to be displaced (upwardly in FIG. 1). This motion in turn pivots the gear lever 36, vertically displaces the intermediate link 44, and pivots the transmission link 40 clockwise. This pivoting of the transmission link 40 pushes the tie rod 46 to the right in FIG. 1 which opens the sash lock 12 to release the window for opening.

Continued turning of the handle 22 then causes the drive linkage 26 to be pivoted to open the window. Further, after only a small amount of opening, the trip lever 48 (as the window moves clear of its trigger 50) is moved back by the compression spring 54 to locate the gear lever projecting tab 36c in its recess 52. This thus ensures that the tie rod 46 and the connected sash lock stay in the open position so that the lock is not inadvertently projecting to hinder reclosing of the window.

Figure 2:
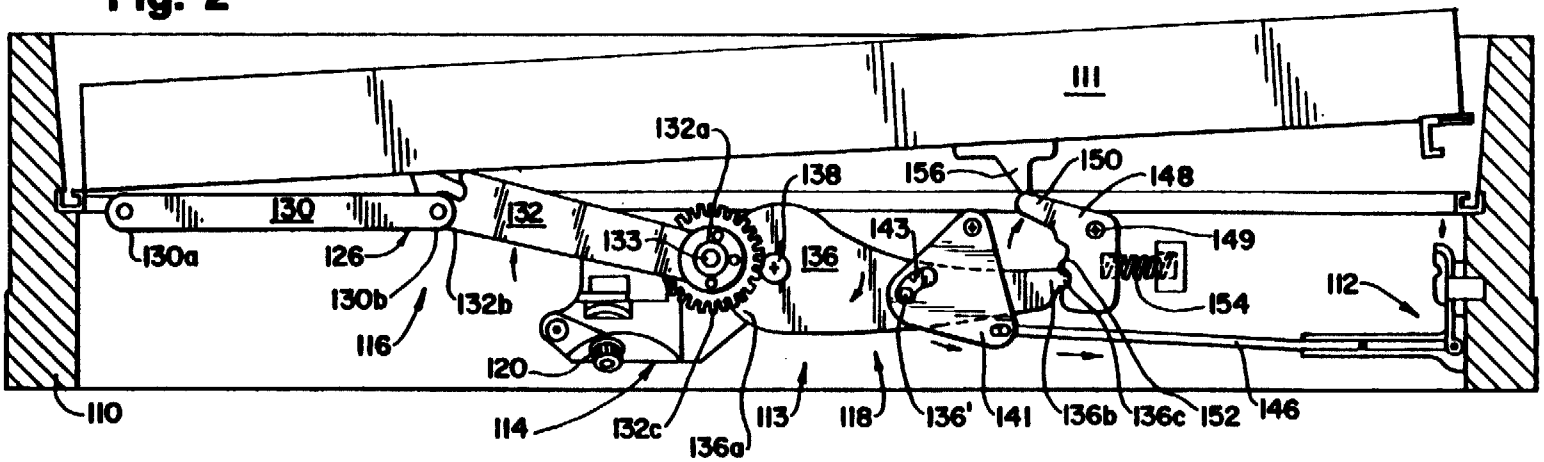
FIG. 2 is a plan view of the operating components of a second embodiment of the present invention.

An alternative embodiment of the present invention is shown in FIG. 2. The FIG. 2 embodiment is similar to that shown in FIG. 1, and thus components which are comparable to those in the FIG. 1 embodiment are given the same reference numerals but plus one hundred in FIG. 2 (for example, the gear lever is identified as "36" in FIG. 1 and "136" in FIG. 2).

In the FIG. 2 embodiment, the lock linkage 118 has a cam 141 with an arcuate slot 143 extending therethrough. The cam 141 is pivotally connected to the base 114 at a pivot 145. The gear lever 136 has an outward extending pin 136' which is received by the slot 143 of the cam 141.

This embodiment thus provides operation similar to that described with respect to FIG. 1 except that, in the FIG. 2 embodiment, movement of the tie rod 146 is controlled directly through the cam 141 by the coaction of the pin 136' in the cam arcuate slot 143. This embodiment offers the benefit of fewer parts and increased simplicity.

Figure 3:
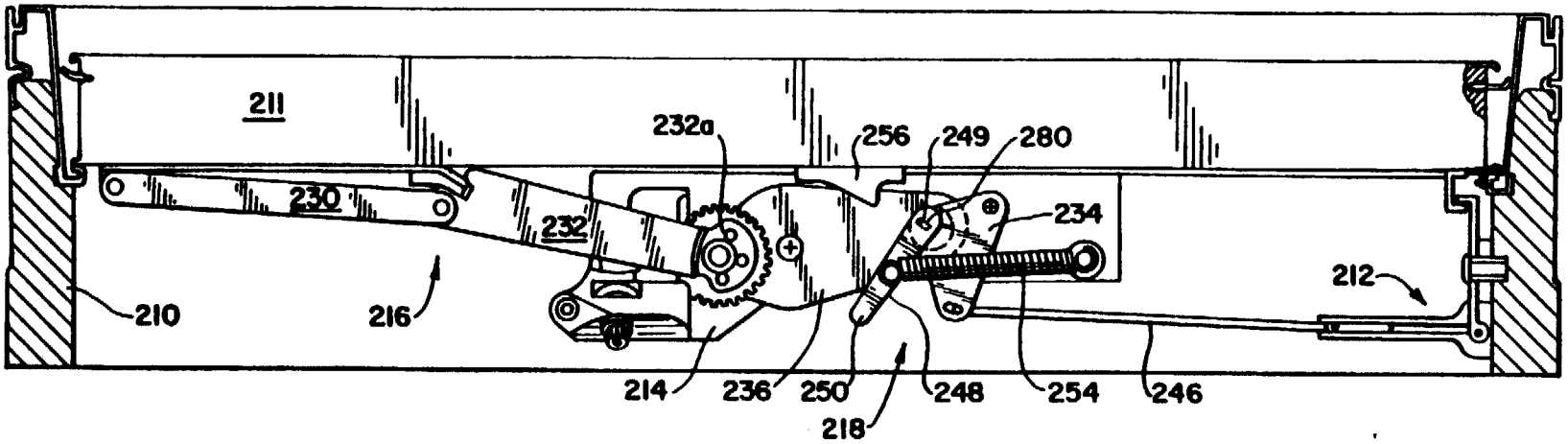
FIG. 3 is a plan view of the operating components of a third embodiment of the present invention, shown in the locked position.
Figure 4:
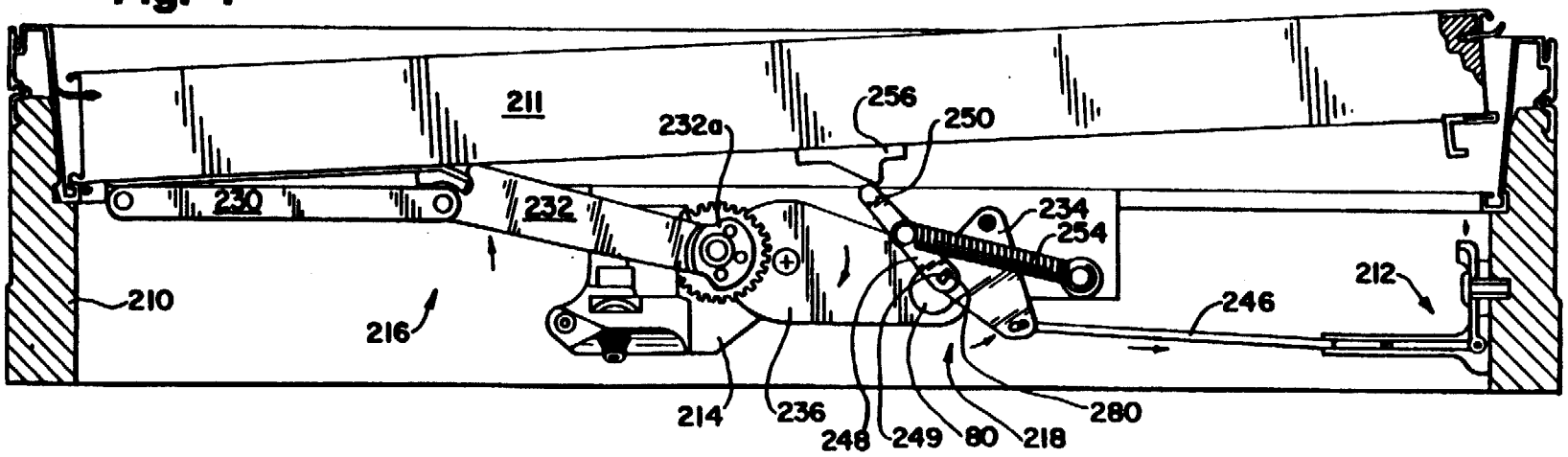
FIG. 4 is a plan view of the embodiment of FIG. 3 shown in the open position.
Figure 5:
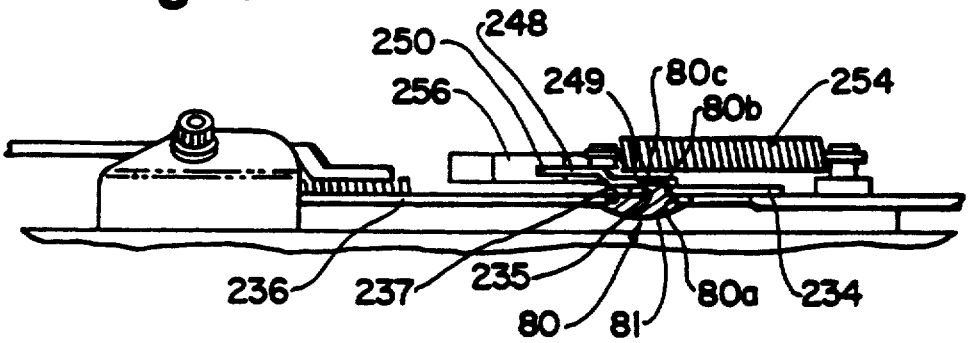
FIG. 5 is a side view of the operating components of the embodiment of FIG. 3.

Yet another embodiment of the present invention is shown in FIGS. 3–5. This embodiment is similar to the previously described embodiment, and thus discussion is had here only with respect to any significant differences found with this embodiment. Further, components in this embodiment which are comparable to those in the FIG. 1 embodiment are given the same reference numerals but plus two hundred in FIGS. 3–5 (for example, the gear lever is identified as "36" in FIG. 1 and "236" in FIGS. 3–5).

The FIG. 3–5 embodiment includes a lock linkage 218 adjacent a deployment linkage 216 and having a gear lever 236 and a lock link 234. A motion-transmitting tie rod 246 is pivotally connected to the lock link 234 and engages a suitable sash lock 212. A trip lever 248, with an integral trigger portion 250, is pivotally connected to the lock linkage at a pivot 280. A tension spring 254 is connected between the trip lever 248 and the base 214.

A rotatable fastener 80 is provided at the union of the lock link 234, the gear lever 236, and the trip lever 248. As best shown in FIG. 5, the rotatable fastener 80 has a plurality of eccentric shoulders 80a, 80b, 80c.

The lock link 234 and gear lever 236 have cylindrical openings 235 and 237, respectively, which pivotally receive the first and second fastener eccentric shoulders 80a and 80b, respectively.

The trip lever 248 has an opening 249 which receives the keyed fastener shoulder 80c such that the trip lever 248 is precluded from pivoting relative to the fastener 80. The fastener 80 further includes a head 81 for precluding axial disengagement of the joined members.

With this arrangement of the fastener 80 and eccentric shoulders, it should be noted that the angular position of the trip lever 248 defines the orientation of the gear lever 236 and lock link 234. The eccentricity of the shoulders establishes a complex circumvolutory motion of the three pivoted elements about the joint 280 when the trip lever is rotated.

With the FIG. 3–5 embodiment, opening the window is accomplished by applying a rotational force to the handle, whereby rotational forces are imparted to the deployment linkage 216 such that the sash 211 is pivotally opened as detailed above. To close the window, a force is applied to the handle whereby the deployment linkage 216 is oppositely actuated so that the sash 211 is pivoted toward the window frame 210.

While the window is unlocked, the trip lever 248 is arranged as shown in FIG. 4 with the trigger 250 extending upwardly (and the tie rod 246 biased fully to the right to maintain the sash lock in an open [retracted] position). When the window sash 211 is inwardly pivoted to the point where the stop 256 engages the trigger 250, the trip lever 248 is forcibly pivoted.

Continued closing of the window sash 211 further pivots the trip lever 248 until the window sash 211 is shut. At that point, continued rotation of the handle can no longer pivot the gear arm 232, and instead will cause the gear arm toothed end 232a to move (down in FIGS. 3–4) and thereby pivot the gear lever 236 about its fixed pivot 238. This pivoting in turn results in relative pivoting of the fastener 80, trip lever 248, and lock link 234 until the tension spring 254 passes overcenter beyond the fastener 80. At that point, the tension spring 254 pulls the trip lever 248 and lock link 234 to the position shown in FIG. 3, with the tie rod 246 biased fully to the left and locking the sash lock.

When it is desired to thereafter open the locked window, turning the handle in the opposite direction will automatically unlock the sash lock 212 such as previously described with the FIG. 1 embodiment. That is, since the window is locked shut by the sash lock 212, the initial turning of the handle will cause the gear arm toothed end 232a to move (up in FIGS. 3–4) and thereby pivot the gear lever 236 about its fixed pivot 238. This in turn causes pivoting of the fastener 80, trip lever 248, and lock link 234 until the tension spring 254 passes overcenter, at which point, the tension spring 254 biases the trip lever 248 and lock link 234 toward the position shown in FIG. 4. This in turn pushes the tie rod 246 back to the right and unlocks [retracts] the sash lock 212 to release the window for opening.

Continued turning of the handle then causes the deployment linkage 216 to be pivoted to open the window. Further, after only a small amount of opening, the trip lever 248 (as the window stop 256 moves clear of its trigger 250) is moved back by the tension spring 254 to its projecting position (see FIG. 4) where it will be engaged when the window is again closed.

Still further, the operator of the present invention can be easily operated when installed. Operation provides virtually foolproof security inasmuch as the window is automatically locked when closed (and unlocked when opened) without requiring any additional action by the operator. Therefore, there is no danger of a window being left unlocked because the operator forgot to take the additional action required to lock it.

We claim:

[1. A casement operator for a window having a window frame and a movable window sash and sash lock comprising:

a base mounted to the window frame;

a deployment linkage connectable between the window frame and said base and operable to cause movement of the window sash;

a rotatable handle;

a gear drive interconnecting said handle and said deployment linkage;

a lock linkage coacting with said deployment linkage and sash lock and having a window-actuated trigger for activating said lock linkage, said lock linkage preventing forcing of the deployment linkage in the event that the window is forced when closed.]

2. A casement operator for a window having a window frame and a moveable window sash and sash lock comprising:

a base mounted to the window frame;

a deployment linkage connectable between the window frame and said base and operable to cause movement of the window sash;

a [rotatable handle] *rotary drive;* a *rotatable* gear [drive interconnecting said handle] *between said rotary drive* and said deployment linkage;

a lock linkage coacting with said deployment linkage and sash lock and having a window-actuated trigger for activating said lock linkage, said lock linkage including a plurality of *pivotable* rigid links in pivotal engagement with said deployment linkage and in driving engagement with said [rotatable handle]ep *rotary drive,* a motion-transmitting tie rod intermediate said rigid links and the sash lock, and latching means for restricting the movement of said lock linkage during a non-locking mode of operation of said operator.

3. The casement operator of claim 2 wherein said latching means comprises a trip lever with a trigger pivotally secured to said base and engageable with said lock linkage.

4. The casement operator of claim 3 wherein during a non-locking mode of operation of said operator said trigger extends beyond the window frame with said trip lever engaged with said lock linkage.

5. The casement operator of claim 4 wherein a trigger actuation structure is disposed on the window sash and engages said trigger when the window sash is proximate to its closed position.

6. The casement operator of claim 3 wherein said trip lever is *pivotally* interconnected with the rigid links of said lock linkage.

7. The casement operator of claim 4 wherein said deployment linkage includes:

a support link fixedly pivoted to the window sash on one end and to the window frame on the other end;

a slider connected to the window sash and movable relative to the window frame; and linkage means between the slider and said gear [drive] for transmitting motion between said [rotatable handle] *rotary drive* and said slider such that [handle rotation] *the drive* imparts motion to said slider to move said window to an open position.

8. The casement operator of claim 7 wherein said linkage means comprises:

a drag link pivotally connected to the window sash; and a gear arm having two ends, the first of said ends being drivably connected to said gear [drive], and the second of said ends being pivotally connected to said drag link.

9. The casement operator of claim 4 wherein said window sash is pivotally connected at one end about an axis movable relative to the window frame, and said deployment linkage includes:

a support link fixedly pivoted to the window sash on one end and to a slider movable relative to the window frame on the other end; and a drive link having one end drivably engaging said drive gear and having an opposite end engaging the window sash;

whereby said support link and drive link transmit motion between said [rotatable handle] *rotary drive* and said slider such that handle rotation imparts [motions] *motion* to said slider.

10. A casement operator for a window having a window frame and a movable window sash and sash lock comprising:

a base mounted to the window frame;

a deployment linkage connectable between the window frame and said base and operable to cause movement of the window sash;

a [rotatable handle] *rotary drive;* a *rotatable* gear [drive interconnecting said handle] *between said rotary drive* and said deployment linkage; and a lock linkage coacting with said deployment linkage and sash lock for activating said lock linkage, said lock linkage including a cam pivotally connected to said base and having an arcuate slot extending therethrough, a gear lever having a pin projecting therefrom and received in the arcuate slot of said cam for controlling relative rotation therebetween, said gear lever being in driving engagement with said rotatable [handle] *gear,* a motion-transmitting tie rod intermediate said cam and the sash lock, and a window actuated trigger pivotally secured to said base and engageable with said gear lever wherein during a non-locking mode of operation of said operator said trigger extends beyond the window frame with said *trip lever engaged with said gear lever to restrict* movement of said gear lever.

11. A casement actuation and locking operator for a window having a window frame, a movable window sash, and a sash lock, comprising:

a base mounted to the window frame;

a deployment linkage connectable between the window sash and said base and operable to cause movement of the window sash;

a [rotatable handle] *rotary drive;* a gear [drive drivingly interconnecting said handle and] *rotatable about an axis of a gear pivot to operate* said deployment linkage;

a motion-transmitting tie rod operably connected to the sash lock;

a lock linkage coacting with said deployment linkage and sash lock, said lock linkage including a gear lever in pivotal engagement with said deployment linkage, and means for [linkage] *linking* said gear lever to the tie rod, *said linking means being pivotable about a fixed axis substantially parallel to said gear pivot axis whereby pivoting of said linking means moves said tie rod*; and means adjacent said lock linkage for establishing a differential action to effectuate either window actuation or window locking upon rotation of said [handle] *drive.*

12. The casement operator of claim 11 wherein said establishing means comprises a trip lever with an integral trigger and a spring element connected at one end to said trip lever and at another end to said base.

13. The casement operator of claim 12, wherein during a non-locking mode of operation of said operator said trip lever engages said lock linkage to preclude actuation of said lock linkage by said [rotatable handle] *drive.*

14. The casement operator of claim 12, wherein said linking means includes a lock link secured to said tie rod and pivotally connected to said base, and further comprising a fastener defining relative pivots between said lock link, said gear lever, and said trip lever.

15. The casement operator of claim 14, wherein said fastener defines a pivot for said gear lever which is eccentric from the pivot defined for the lock link.

16. The casement operator of claim 15, wherein during a non-locking mode of operation of said operator said trip lever positions said gear lever pivot and said lock pivot to preclude actuation of said lock linkage by said [rotatable handle *drive.*

17. The casement operator of claim 14 wherein said fastener is a rotatable element about which said lock link and said gear lever freely rotate, and to which said trip liver is rotatably fixed.

18. The casement operator of claim 17 wherein said fastener has a plurality of eccentric shoulders for pivotally joining said lock link and said trip lever for circumvolutory movement thereabout.

*19. A casement actuation and locking operator for a window having a window frame, a movable window sash, and a sash lock, comprising:*

*a base mounted to the window frame;*

*a rotary drive;*

*a deployment linkage connectable between the window sash and said base and operable to cause movement of the window sash;*

*a gear rotatably driven by said drive about an axis of a gear pivot to operate said deployment linkage;*

*a motion-transmitting tie rod operably connected to the sash lock;*

*a lock linkage coacting with said deployment linkage and sash lock, said lock linkage including*

*a gear lever pivotable about a fixed axis in response to movement of the gear pivot, said fixed axis being substantially parallel to the axis of the gear pivot, and*

*means for linking said gear lever to the tie rod; and*

*means adjacent said lock linkage for establishing a differential action to effectuate either window actuation or window locking upon rotation of said drive.*

*20. A casement operator for a window having a window frame, a movable window sash and a sash lock having a first position locking said sash to said frame and a second position releasing said sash from said frame, comprising:*

*a base mounted to the window frame;*

*a deployment linkage connectable between the window frame and said base and operable to control movement of the window sash;*

*a rotary drive;*

*a gear driven by said drive about an axis of a free pivot slightly displaceable relative to the drive, said gear rotating about the free pivot to drive said deployment linkage;*

*a gear lever pivotable about a base axis and connected to the gear free pivot and sash lock, said gear lever pivoting about said base axis in response to displacement of the free pivot to change the position of the sash lock, said base axis being substantially parallel to the axis of the free pivot; and*

*means for securing said gear lever against pivoting when said window sash is open.*

*21. The casement operator of claim 20, further comprising a window-actuated trigger operating said securing means.*

* * * * *